United States Patent Office 2,891,976
Patented June 23, 1959

2,891,976
BIS-(HYDROXYALKYL)DEHYDROABIETYL-HYDRAZINIUM SALTS

Bernard Rudner, Baltimore, Md., assignor to W. R. Grace & Co., New York, N.Y., a corporation of Connecticut No Drawing. Application April 2, 1956
Serial No. 575,304

9 Claims. (Cl. 260—404.5)

This invention relates to a class of substituted organic compositions, the structures of which contain a substituted hydrazine, and more particularly to a class of quaternary hydrazinium salts. In one specific aspect, it relates to a new class of chemical compounds to which the generic name, bishydroxyalkyldehydroabietylhydrazinium salts, is ascribed. In another aspect, it relates to the derivatives of these salts.

The commercial development of hydraziniumchlorides has been retarded because their availability was dependent on the production or use of expensive and hard-to-obtain substituted hydrazines. For example, in order to prepare the compounds which are generically related to those falling within the purview of my invention by initially preparing substituted hydrazines, it would have been necessary to begin the preparation by reacting a secondary dihydroxyalkylamine with nitrous acid. Theoretically, this reaction would result in the formation of the nitrosylamine which could be reduced to the corresponding substituted hydrazine. The substituted hydrazine could then be treated with the dehydroabietylchloride to form such compounds as my invention embraces. As a practical matter, however, this has not been done because of the inherent difficulties in this multistep reaction. The reaction of the secondary amine with nitrous acid produces inter alia organic nitrites which, under the reaction conditions, are explosive.

It has been recently discovered that chloramine will react with tertiary amines to form 1,1,1-trisubstituted hydrazinium chlorides. This reaction presents practically limitless possibilities in the preparation of new and interesting chemical compounds which, because of their structure and inherent physical properties, have a wide range of uses. Tertiary amines are readily available bases. Chloramine is an excellent reagent, since it can be economically obtained in commercial quantities by using the well known process of Harry H. Sisler et al., described in U.S. Patent No. 2,710,248, where chlorine and ammonia are reacted in the vapor phase to produce chloramine (monochloramine).

This chloramine-tertiary amine reaction works decidedly well under a wide variety of conditions. It may be conducted successfully in anhydrous solution using as solvents either an excess of the reactant amine or an unreactive organic liquid. The reaction may also be carried out in aqueous solution if such conditions appear to be preferable. The term unreactive as applied to the organic liquid solvent is intended to embrace those solvents which do not react preferentially with ammonia, chloramine, or the tertiary amine selected for the reaction under the conditions employed. When the reaction is conducted in anhydrous solution, the desired hydrazinium chloride frequently precipitates as the reaction progresses. In aqueous solution, however, it is usually necessary to concentrate the solution or to evaporate to dryness in order to obtain the desired product. If gaseous chloramine is to be used as a reactant, it is necessary to have some base such as ammonia present to stabilize the chloramine. Nitrogen may be used as a diluent, although it is not essential, for this gaseous mixture.

In accordance with the present invention, I have found a novel and useful generic class of hydrazinium salts which correspond to the general formula:

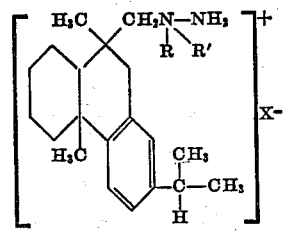

where R and R' are members selected from the group consisting of hydroxyalkyl, hydroxyalkoxyalkyl, and hydroxypolyalkoxyalkyl radicals. X is an acid anion equal to or greater than $H_2CO_3$ in strength. For example, X can be a chloride anion or an oleate, stearate, napthenate, picrate, xanthate, sulfate, fluosilicate, ferrocyanide, chromate or thiocyanate radical.

It is therefore an object of the present invention to provide a new class of useful hydrazinium salts which can be made in commercial quantities.

In practising my invention, for example, a gaseous mixture of chloramine and ammonia can be passed into the desired tertiary amine which is preferably thinned out by addition of a solvent.

As illustrative of the versatility of my invention, the table, shown hereunder, lists typical parent amines along with the corresponding product dehydroabietylhydrazinium chlorides and the derivative dehydroabietylhydra-

TABLE

| Dehydroabietylamine | Product | Dehydroabietylhydrazinium salts |
| --- | --- | --- |
| (1) Bis-(2-hydroxyethyl) | $[RN(CH_2CH_2OH)_2]^+Cl^-$ | 1,1-Bis-(2-hydroxyethyl) chloride. |
| (2) Bis-(2-hydroxyethyl) | $[RN(CH_2CH_2OH)_2]^+\frac{1}{2}CrO_4^-$ | 1,1-Bis-(2-hydroxyethyl) chromate. |
| (3) Bis-(2-hydroxyethyl) | $[RN(CH_2CH_2OH)_2]^+C_6H_2N_3O_7^-$ | 1,1-Bis-(2-hydroxyethyl) picrate. |
| (4) Bis-(2-hydroxypropyl) | $[RN(CH_2\overset{CH_3}{C}HOH)_2]^+Cl^-$ | 1,1-Bis-(2-hydroxypropyl) chloride. |
| (5) Bis-(2-hydroxypropyl) | $[RN(CH_2\overset{CH_3}{C}HOH)_2]^+\frac{1}{2}Cr_2O_7^-$ | 1,1-Bis-(2-hydroxypropyl) dichromate. |
| (6) Bis-(2,3-dihydroxypropyl) | $[RN(CH_2CHOHCH_2OH)_2]^+\frac{1}{2}SO_4^-$ | 1,1-Bis-(2,3-dihydroxypropyl) sulfate. |
| (7) Bis-(4-hydroxybutyl) | $[RN(CH_2CH_2CH_2CH_2OH)_2]^+Cl^-$ | 1,1-Bis-(4-hydroxybutyl) chloride. |
| (8) Bis-(2-hydroxyethoxyethyl) | $[RN(CH_2CH_2OCH_2CH_2OH)_2]^+Cl^-$ | 1,1 - Bis - (2 - hydroxyethoxyethyl)-chloride. |
| (9) Bis-(2-hydroxyethoxyethyl) | $[RN(CH_2CH_2OCH_2CH_2OH)_2]^+C_{17}H_{35}CO_2^-$ | 1,1 - Bis - (2 - hydroxyethoxyethyl)-stearate. |
| (10) Bis-(2-hydroxypropoxy-1) | $[RN(CH_2\overset{CH_3}{C}HOCH_2\overset{CH_3}{C}HOH)_2]^+C_{17}H_{33}CO_2^-$ | 1,1-Bis-(2-hydroxypropoxy-1) oleate. |
| (11) Bis-(2-hydroxytetraethoxyethyl) | $[RN[(CH_2CH_2O)_4CH_2CH_2OH]_2]^+Cl^-$ | 1,1 - Bis - (hydroxytetraethoxyethyl)-chloride. |
| (12) Bis-(2-hydroxytetraethoxyethyl) | $[RN[(CH_2CH_2O)_4CH_2CH_2OH]_2]^+C_2H_5O\overset{S}{\underset{\|}{C}}S^-$ | 1,1 - Bis - (hydroxytetraethoxyethyl)-ethyl xanthate. |

The above amines (the commercial products are available under the tradename "Polyrad"), are intended to be merely suggestive as there are wide range homologs of these compounds which would be equally applicable in the production of individual species of my new and novel class.

I have successfully obtained my unique compounds when I have conducted the reaction of chloramine and the desired amine in anhydrous solution in the presence of excess amine in a solvent, in anhydrous solution in the presence of an unreactive organic solvent, or an aqueous solution. I have found it to be convenient, for example, to use such solvents as xylene, dimethylformamide, and chloroform dioxane although many others are equally suitable. My novel compounds can be readily recovered from the reaction mixture and purified by conventional laboratory procedures.

My invention is further illustrated by the following examples:

Example I

A generator was constructed to produce a gaseous mixture of chloramine, ammonia and nitrogen using the aforementioned process of Sisler et al. Such a gaseous mixture was bubbled into a solution of commercial bis-(2-hydroxyethyl)dehydroabietylamine, 20 g., in 70 ml. xylene for 90 minutes. During gasification, the temperature rose spontaneously to 53° C., and remained there for most of the reaction period. Chloramine uptake was fairly rapid; approximately 90% of the stoichiometric quantity was converted in the reaction vessel. The white solid that formed was separated after the reaction mixture had been allowed to stand. Analysis showed that it was impure product, 1,1-bis-(2-hydroxyethyl)-1-dehydroabietylhydrazinium chloride, dispersed in a greater weight of ammonium chloride. Evaporation of the clear, light brown filtrate gave 22 g. of a very thick brown oil, which contained the bulk of the desired product.

A small portion of the crude oily product was purified by partitioning between carbon tetrachloride and water; evaporation of the charcoaled water layer gave a thick, light brown gum representing almost pure hydrazinium chloride. Repeated recrystallization of the reaction precipitate from 2-propanol gave pure 1,1-bis-(2-hydroxyethyl)-1-dehydroabietylhydrazinium chloride as off-white, wet-waxy crystals that softened, then melted with decomposition at 201–206° C. (this range due to the fact that dehydroabietylamines are complex mixtures of isomers).

All attempts to obtain a solid from the gum failed. Its essential identity to the solid product obtained from propanolic recrystallization was established by comparison of its solubilities (soluble in water, alcohol, chloroform, and, to a lesser extent, xylene); derivatives (hexafluorophosphate, an unfilterable wax, M.P. 131–133° C.); and ultra violet absorption spectra (the spectrum of the product is slightly hypsochromic compared to the starting amine, and is not altered on treatment of the product with mineral acid).

The parent amine, dehydroabietyldiethanolamine, is a thick, light brown liquid, available commercially as Polyrad 0200. It is prepared by the reaction of limited amounts of ethylene oxide with the primary amine (obtainable from dehydrogenated and aromatized rosin), and is therefore a complex mixture of both stereoisomeric and homologous reaction products. The complexity and inhomogeneity of this commercial product is indicated by the manufacturers data: its experimentally-determined neutralization equivalent is approximately 5% greater, and its nitrogen content almost 5% less, than that calculated for a pure product of linear formula $C_{24}H_{39}NO_2$. It is therefore not surprising that completely crystalline, pure entities, of sharp melting points, cannot be obtained as reaction products.

Example II

The same amine, Polyrad 0200, 2.0 g., was suspended in 100 ml. of chilled concentrated ammonium hydroxide by means of an anionic dispersing agent and good agitation. It was treated dropwise, over a period of 2 hours at 10–15° C., with a cold solution of sodium hypochlorite containing 0.75 g. (2 equivalents) of that compound. Stirring was continued at 15–20° C. overnight, during which time all of the active chlorine had disappeared. The opalescent, yellowish mixture was evaporated to constant weight at room temperature, leaving a mixture of tan oil and off-white, largely crystalline, solid. The mixture was extracted first with hexane, to remove the unreacted amine, and then with chloroform, to leach the product from the alkaline-containing mass. The chloroform extract, on evaporation, left a small quantity of clear, dark gum. This gum was taken up in water, charcoaled, and clarified. The aqueous solution was then evaporated. The light-brown gum thus obtained was shown by its reactions and spectrum to be chiefly the desired product, 1,1-bis-(2-hydroxyethyl)-1-dehydroabietylhydrazinium chloride. This procedure offers no advantage in yield or convenience over that described in Example I.

Example III

The bis-(2-hydroxypolyethoxyethyl)dehydroabietylamine which is commercially available as Polyrad 0500, is described by its manufacturers as having an average formula of:

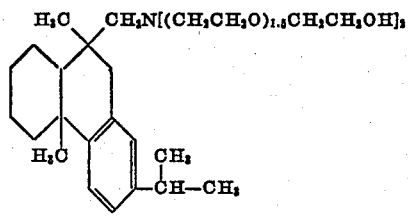

A portion of this amine was dissolved, 5 g., in 100 ml. of dimethylformamide, and subjected to the chloramine treatment described in Example I. Although less heat of reaction was given off (in comparison with the other examples), a more rapid and more nearly quantitative absorption of chloramine occured. The solid that precipitated during the course of reaction was shown to be ammonium chloride, containing only traces of the desired product. Evaporation of the clear, tan filtrate at room temperature gave a mixture of viscous tan oil and brown paste. Selective extractions with first hexane, then benzene, then limited amounts of carbon tetrachloride, left as residue a brown semi-solid, crude 1,1-bis-(hydroxysesquiethoxyethyl)-1-dehydroabietylhydrazinium chloride. By repeatedly charcoaling, clarifying, and evaporating aqueous solutions of a portion of the gum, there was obtained finally a light tan, soft wax, the desired hydrazinium chloride, 95% pure by chloride titration. The product was clearly soluble in water (the parent amine forms a milk at 0.2% concentration in water), soluble in acetone and chloroform, and decreasingly soluble in carbon tetrachloride, benzene, and hexane. It could not be converted to a solid by vacuum drying, or trituration with solvents. Its absorption spectrum was superimposable on that of the product described in Example I. Although it failed to form a water-insoluble hexafluorophosphate salt, it did yield a water-insoluble dilaturate, M.P. 210–213° C. (dec).

Example IV

The product obtained in Example III, 5 g., was dissolved in 100 ml. of water. Portions of the clear aqueous solution, treated with aqueous solutions of the following reagents, gave the following results:

(1) Zinc fluosilicate: Fluffy white precipitate, decomposing without melting, containing Zn, F, and organic matter.
(2) Sodium ferrocyanide: Yellow, light-sensitive, water-insoluble salt, of no definite melting or decomposition point.
(3) Sodium chromate: Yellower than the product from (2), and less light sensitive, but more heat-sensitive.
(4) Sodium thiocyanate: White solid dispersible in boiling water, strong reducing agent. Decomposes without melting at about 210° C.
(5) Ammonium oleate: Brownish waxy powder with a marked tendency to form gels in organic solvents and dispersions in boiling water. Melts at about 96° C.

Example V

Polyrad 0500, 5 g. in 50 ml. of dioxane, was treated with two equivalents of chloramine from the aforementioned generator at 15–20° C. After the active chlorine had been consumed, the reaction mixture was filtered into two volumes of hexane. The combined solvents were decanted free of the lower more viscous layer that had formed; they contained no ionic chloride and therefore no product. The viscous lower layer was washed thoroughly (by decantation) with hexane. It was then vacuum dried to give an 84% pure hydrazinium chloride.

Repetition of the chloramine reaction using hexane as a solvent gave as precipitate during the reaction, the viscous hydrazinium chloride and some ammonium chloride. Unless care is taken to keep the volume of hexane up during gasification, the parent amine coprecipitates.

Example VI

Bis-(2-hydroxyenneaethoxyethyl)dehydroabietylamine, a product available commercially as Polyrad 2000, has an average structure of:

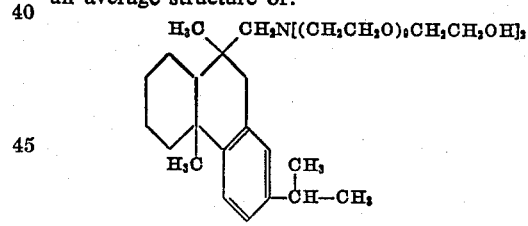

A portion of this amine was dissolved in dioxane, 5 g. in 50 ml., and treated with a chloramine gas stream as described in Example V. The product that precipitated during reaction consisted of both solid ammonium chloride and oily 1,1-bis-(2-hydroxyenneaethoxyethyl)-1-dihydroabietylhydrazinium chloride. Addition of three volumes of hexane to the reaction mixture gave additional oily product, which was freed from solvents by decantation, and then from ammonium chloride by extraction with chloroform. The tan oil obtained on evaporation of the chloroform was soluble in water, and insoluble in benzene. It did not form an insoluble picrate or hexafluorophosphate. It did, however, yield insoluble products on treatment of aqueous solutions with aqueous potassium mercuriiodide (dark oil), chloroplatinic acid (oil), potassium ferricyanide (light unstable solid), sodium dichromate (dull orange-brown solid) and sodium stearate (white powder forming gels in chloroform).

Example VII

The tertiary dehydroabietylamine containing an average of eleven $C_2H_4O$ groups per molecule (available commercially as Polyrad 1100) was subjected, without solvent, to a chloramine gas stream. After two equivalents of chloramine had been consumed, and the gasification stopped, the reaction mixture consisted of a dispersion of white solid in apparently two liquid phases. Treatment of the mixture with an equal volume of butanol, decantation of the upper phase (butanol plus unreacted amine), extraction of the lower phase with chloroform, and evaporation of the chloroform extract, gave a viscous brown oil, that comprised almost all of the desired hydrazinium product. The yield by this procedure was not as good, nor the product as pure, as when a solvent was used.

My new and novel compounds show remarkable utility. All of my products show both surfactant and biocidal properties, the extent of which is a function both of the anion and cation. In general, surfactant properties are exhibited most strongly by the chloride, nitrate, acetate, and phosphate derivatives of my compounds. The lower molecular weight amines (e.g. Polyrad 0200) and the higher ones (e.g. Polyrad 2000) yield the poorest foamers.

In general, the lower molecular weight hydrazinium compounds are the better biocides, with a change of anion causing a marked change in power. Thus, the hydrazinium chloride of Example I is superior to others in inhibition of growth of both bacteria (e.g. *B. subtilis*) and fungi (*A. niger*). Both the cupric fluosilicate complex and the xanthate are better fungicides than the chloride. These biocidal powers make my novel compounds valuable as disinfectants, preservatives, and sanitizers. Combining the hydrazinium cation with a known biocidal anion, e.g. pentochlorphenate, gives a product

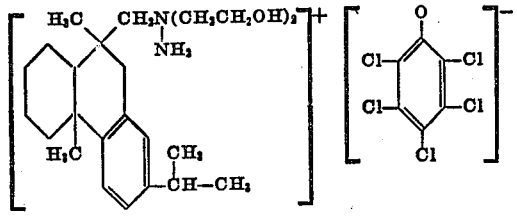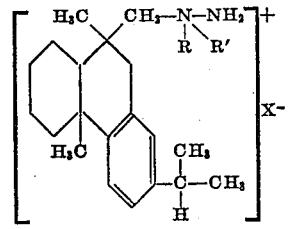

of even greater efficiency in the control of mildew and slime, e.g. in paints, protein glues, and papers.

My novel compounds are useful corrosion inhibitors, especially effective in limiting and preventing the atmospheric corrosion of metals. For this purpose, the polyethoxyethyl compounds e.g. those derived from Polyrads 1100, 0500 and 2000 are preferable, with the anion affecting the usage more than the result. Thus, the hydrazinium chlorides are strongly adsorbed from aqueous solution onto the surface of the metal (copper or steel) and are thus useful in "pickling" operations. On the other hand, the corresponding hydrazinium naphthenates, 2-ethylhexanoates and stearates are soluble or dispersible in cutting oils and degreasing solvents, and are therefore most useful in lubrication and protection by non-resin coating.

I claim:
1. As a new chemical compound 1,1-bis-(2-hydroxyethyl)-1-dehydroabietylhydrazinium chloride.
2. As a new chemical compound, 1,1-bis-(2-hydroxysesquiethoxyethyl)-1-dehydroabietylhydrazinium chloride.
3. As a new chemical compound, 1,1-bis-(2-hydroxysesquiethoxyethyl)-1-dehydroabietylhydrazinium oleate.
4. As a new chemical compound, 1,1-bis-(2-hydroxytriethoxysesquiethoxyethyl) - 1 - dehydroabietylhydrazinium chloride.
5. As a new chemical compound, 1,1-bis-(2-hydroxyenneaethoxyethyl)-1-dehydroabietylhydrazinium chloride.
6. New chemical compounds of the general formula:

wherein R and R' are radicals selected from the group consisting of hydroxy lower alkyl, hydroxy lower alkoxy lower alkyl, and hydroxy poly lower alkoxy lower alkyl radicals; and X is an anion.

7. Compounds according to claim 6 wherein R and R' are hydroxy lower alkyl radicals and X is a chloride anion.
8. Compounds according to claim 6 wherein R and R' are hydroxy lower alkoxy lower alkyl radicals and X is a chloride anion.
9. Compounds according to claim 6 wherein R and R' are hydroxy poly lower alkoxy lower alkyl radicals and X is a chloride anion.

References Cited in the file of this patent

Westphal: Ber. 74:759–776; Ber. 74:1365–1372 (1941).

UNITED STATES PATENT OFFICE
CERTIFICATE OF CORRECTION

Patent No. 2,891,976                          June 23, 1959

Bernard Rudner

It is hereby certified that error appears in the printed specification of the above numbered patent requiring correction and that the said Letters Patent should read as corrected below.

Columns 3 and 4, in the table, under the heading "Product", an amino group ($-NH_2$) should be attached to the amino nitrogen (N) of each compound listed.

Signed and sealed this 1st day of December 1959.

(SEAL)
Attest:

KARL H. AXLINE                                      ROBERT C. WATSON
Attesting Officer                                   Commissioner of Patents